United States Patent [19]

Mitch

[11] Patent Number: 4,520,355

[45] Date of Patent: May 28, 1985

[54] JOYSTICK APPARATUS

[75] Inventor: John H. Mitch, Portland, Oreg.

[73] Assignee: Tektronix, Inc., Beaverton, Oreg.

[21] Appl. No.: 399,022

[22] Filed: Jul. 16, 1982

[30] Foreign Application Priority Data

Oct. 31, 1981 [JP] Japan .......................... 56-163676[U]

[51] Int. Cl.3 .......................... G09G 1/00; G06F 3/14

[52] U.S. Cl. .................................... 340/709; 340/706; 340/365 R; 74/471 XY

[58] Field of Search .................... 340/709, 365 R, 706; 74/471 XY; 178/18; 200/6 A

[56] References Cited

U.S. PATENT DOCUMENTS 3,179,755 4/1965 Burnham ........................ 74/471 XY 4,148,014 4/1979 Burson ................................ 340/709

OTHER PUBLICATIONS

IBM Tech. Disclosure Bulletin, vol. 21, No. 9, Feb. 1979, "Single Shot Control for Joystick", pp. 3720–3721, Beausoleil et al.

IBM Tech. Disclosure Bulletin, vol. 21, No. 12, May 1979, "Joystick Resolving Mechanism", pp. 5021–5024, Carmichael.

IBM Tech. Disclosure Bulletin, vol. 22, No. 2, Jul. 1979, "Joystick Resolving Mechanism", pp. 774–775, Williams.

*Primary Examiner*—Gerald L. Brigance

*Attorney, Agent, or Firm*—John H. Bouchard; Francis I. Gray

[57] ABSTRACT

A joystick apparatus is disclosed having a minimum number of component parts associated therewith. The joystick apparatus comprises a first potentiometer, a second potentiometer, a bracket interconnected between the shafts of said first and second potentiometers, and a joystick connected to the base of one of the potentiometers. The bracket is interconnected between the shafts of the first and second potentiometers in a manner such that a movement of the joystick along one axis will impart a rotational movement to the shaft of one potentiometer, but will not impart a rotational movement to the shaft of the other potentiometer.

5 Claims, 7 Drawing Figures

JOYSTICK APPARATUS

BACKGROUND OF THE INVENTION

1. Field of the Invention

The subject matter of the present invention pertains to a joystick apparatus for developing electrical signals representative of the location of a point in a two-dimensional coordinate system.

2. Description of the Prior Art

A joystick apparatus develops a first and a second electrical signal indicative of the location of a point in a two-dimensional coordinate system. The joystick apparatus includes a movable joystick fixed at one end and angularly movable with respect to said one end thereof, the angular position of the joystick with respect to a vertical line defining the point in the two-dimensional coordinate system, the joystick apparatus developing the electrical signals representative thereof. The joystick apparatus is typically used in conjunction with a cathode-ray tube (CRT) display and a digital computer to enter graphic data displayed on the CRT into the digital computer. The joystick apparatus of the prior art contained an excessively high number of component parts. In addition, the joystick apparatus was non-rebuildable. As a result, a high number of rejects resulted. Furthermore, when the joystick is parallel to the vertical line, the first and second electrical signals generated from the joystick apparatus should be zero, and the point should represent the origin of the two-dimensional coordinate system. However, when the joystick of the prior art was approximately parallel to the vertical line, non-zero electrical signals were developed. Therefore, the resultant point did not represent the origin of the two-dimensional coordinate system. In response to the non-zero electrical signals, the resultant point drifted in the two-dimensional coordinate system.

SUMMARY OF THE INVENTION

It is a primary object of the present invention to provide a joystick apparatus devoid of the discrepancies and the disadvantages associated with the joystick apparatus of the prior art.

It is another object of the present invention to provide a joystick apparatus having a minimum number of component parts associated therewith.

It is still another object of the present invention to provide a joystick apparatus including a compensating apparatus designed to compensate for, and thereby eliminate, the drift problem associated with the joystick apparatus of the prior art.

These and other objects of the present invention are accomplished by developing a joystick apparatus comprising a first potentiometer and a second potentiometer for developing said first and second electrical signals therefrom, a single bracket interconnected between the first and second potentiometers, and a joystick connected to the base of one potentiometer. The single bracket is interconnected between the first and second potentiometers in a unique manner such that movement of the joystick along one axis will impart a rotational movement to the shaft of one potentiometer but will not impart a rotational movement to the shaft of the other potentiometer. Similarly, movement of the joystick along an axis orthogonal to said one axis will impart a rotational movement to the shaft of the other potentiometer but will not impart a rotational movement to the shaft of said one potentiometer. As a result, the shafts of the potentiometers are used as bearings for the joystick apparatus. The number of component parts have therefore been reduced. In addition, the joystick apparatus further comprises a compensating apparatus for receiving said non-zero electrical signals from the potentiometers when the joystick is approximately parallel to the vertical line, and for developing electrical signals therefrom which are approximately equal to zero. As a result, said resultant point no longer drifts in the two-dimensional coordinate system.

Further scope of applicability of the present invention will become apparent from the description given hereinafter. However, it should be understood that the details of the description and the specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

A full understanding of the present invention will be obtained from the detailed description given hereinbelow and the accompanying drawings, which are given by way of illustration only, and thus are not limitative of the present invention, and wherein.

DETAILED DESCRIPTION OF THE PREFERRED EMBODIMENT

Figure 1:
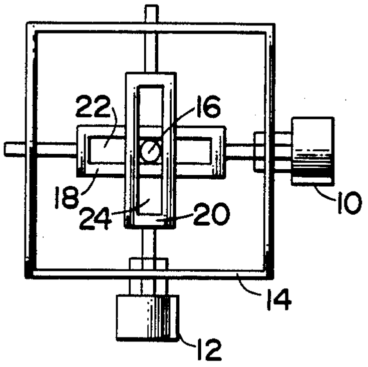
FIG. 1. (PRIOR ART)
FIGS. 1–2 illustrate the prior art joystick apparatus.

Referring to FIG. 1, a joystick apparatus of the prior art is illustrated. In FIG. 1, a pair of potentiometers 10 and 12 are mounted on a common frame 14 and a common control stick 16 (a joystick) controls both potentiometers 10, 12. One end of the control stick 16 is mounted on a stationary member by a universal joint, thereby allowing the other end of the control stick 16 to rotate in both the X and the Y directions. The control shafts of the potentiometers 10 and 12 are coupled to the control stick 16 by respective arm members 18 and 20, the arm members including elongated opening 22 and 24, respectively. Potentiometer 10 is controlled by rotating the control stick 16 in the X direction. Control stick 16 may be rotated in any desired direction to control both potentiometers, 10 and 12, simultaneously.

Figure 2:
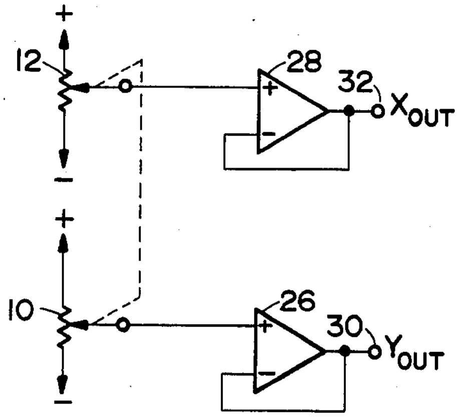
FIG. 2. (PRIOR ART)

The operation of the joystick shown in FIG. 1 may be illustrated, electrically, in FIG. 2. In FIG. 2, the fixed terminals of each potentiometer 10, 12 are connected between positive and negative voltage sources, e.g., between ±12 volts. The output voltages on the sliders are connected to output terminals 30, 32 via respective voltage followers 26, 28. The output voltages present at output terminals 30, 32 are supplied to both orthogonal deflection means of a cathode-ray tube (CRT) for deflecting the electron beam generated within said tube to a selected coordinate on the CRT screen, the selected coordinate being defined by the angular position of the control stick 16 (the joystick) shown in FIG. 1.

Figure 3A:
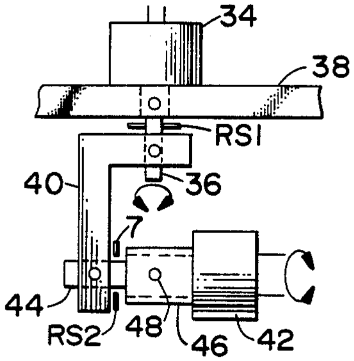
FIGS. 3A–3B illustrate the joystick apparatus of the present invention.

One of the major disadvantages of the joystick apparatus shown in FIG. 1 is the large number of component parts associated therewith. As a result, the overall size of the joystick apparatus was excessively large. This disadvantage has been eliminated by virtue of the joystick apparatus of the present invention, shown in FIG. 3A. In FIG. 3A, a joystick apparatus of simple construction and small size is illustrated, having a low number of component parts associated therewith.

Figure 3B:
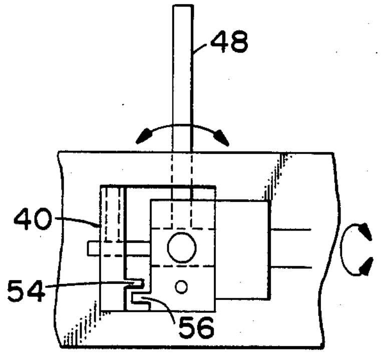

FIGS. 3A and 3B illustrate, respectively, top and front views of the joystick apparatus of the present invention. A first potentiometer 34 includes a control shaft 36 mounted on a frame 38. An L-shaped arm 40, the single bracket, is mounted on the control shaft 36 at the short leg portion thereof. A second potentiometer 42 includes a control shaft 44 mounted near the free end of L-shaped arm 40. The second potentiometer 42 includes a stick base 46 extending from and being connected to the body of the second potentiometer 42. A control stick 48 is mounted on said stick base 46. Return spring mechanisms RS1 and RS2 are mounted on shafts 36 and 44 in order to return the control stick 48 to a perpendicular, center position when the control stick 48 is released.

Figure 4:
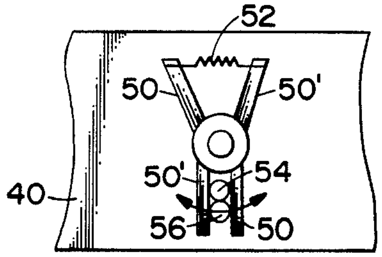
FIG. 4 illustrates a return spring mechanism utilized in conjunction with the joystick apparatus of the present invention to maintain the joystick at an angular position approximately parallel to the vertical line in order to minimize the drift problem associated with the joystick apparatus of the prior art.

One example of a return spring mechanism (RS1 or RS2) is shown in detail in FIG. 4. In FIG. 4, a pair of return leaves 50, 50′ are mounted on a potentiometer shaft (either 36 or 44), the return leaves 50 and 50′ functioning as a pair of scissors. Return spring 52 is connected between the end portions of return leaves 50, 50′. A pair of fixed projections 54 and 56 are mounted, respectively, on the L-shaped arm 40 and on the frame 38, at different radial distances from potentiometer shaft (36 or 44). Fixed projections may also be mounted on the stick base 46 in lieu of the free end of arm 40.

The joystick apparatus shown in FIGS. 3A, 3B and 4 operates in the following manner: when the control stick 48 is rotated in the vertical (Y) direction, the body of the second potentiometer 42 rotates with respect to its shaft 44. The shaft 36 of the first potentiometer 34 does not rotate. The angle between the two projections 54 and 56 increases as control stick 48 is rotated from the perpendicular, center position in either direction. An increase in said angle between the two projections increases the angle between the return leaves 50, 50′ associated with spring mechanism RS2, to thereby stretch return spring 52. It is, therefore, understood that control stick 48 returns to the perpendicular center position when control stick 48 is released. On the other hand, when the control stick 48 is rotated in the horizontal (X) direction, L-shaped arm 40 and the second potentiometer 42 will rotate as an integral part thereof. A rotation of the control stick 48 in the horizontal (X) direction will rotate the shaft 36 of the first potentiometer 34. The return spring mechanism RS1 operates to stretch its spring 52. The second potentiometer 42 in respect to its shaft 44 remains unrotated in this condition. When the control stick 48 is released, the L-shaped arm 40 and the second potentiometer 42 are returned to their original position. The control stick 48 therefore returns to its perpendicular, center position.

It should be understood that control stick 48 may be rotated freely in any desired direction, other than the X or Y direction. In such a case, the return springs 52 associated with both return spring mechanisms RS1 and RS2 are stretched. As a result, when the control stick 48 is released, the stretched return springs 52 associated with return spring mechanisms RS1 and RS2 force the control stick 48 to return to the perpendicular, center position.

Figure 5:
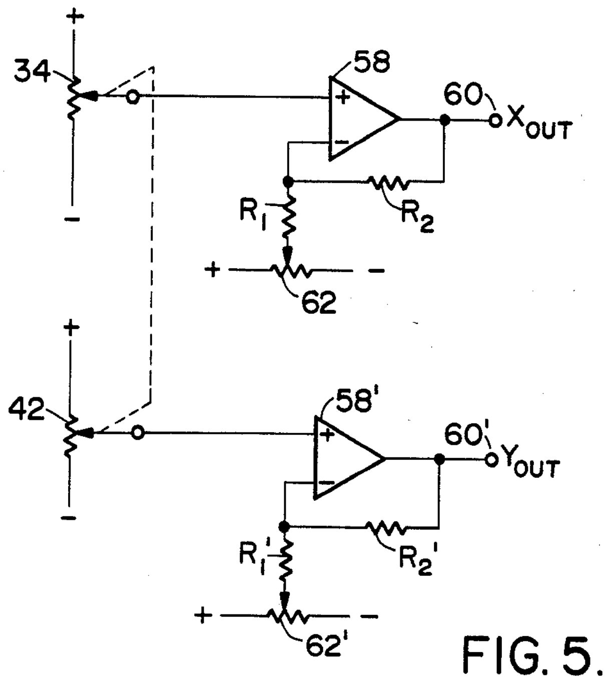
FIG. 5 illustrates an electrical circuit apparatus designed to cancel the non-zero electrical signals generated from the first and second potentiometers thereby eliminating the drift problem associated with the joystick apparatus of the prior art.

When the control stick 48 is released, it should return to the perpendicular center position. Zero volts should appear on the slider of potentiometers 34 and 42. However, when the control stick 48 is released, the return spring mechanisms RS1 and RS2 may not always return the control stick 48 to exactly its perpendicular, center position. Therefore, a non-zero voltage may appear on the slider of potentiometers 34 and 42, and, as a result, a position error may result. This position error causes the drift problem associated with the joystick apparatus of the prior art. FIG. 5 illustrates electrical means for effectively compensating for and thereby eliminating such position error.

In FIG. 5. the output potential from each of the first and second potentiometers 34 and 42 are applied to the non-inverting input terminal of an operational amplifier 58 and 58′. A controllable potential from an additional compensation potentiometer 62 and 62′ is supplied through resistors $R_1$ and $R_1'$ to the inverting input terminal of amplifier 58 and 58′ including feedback resistors $R_2$ and $R_2'$ between the output and inverting input terminals thereof.

Figure 6:
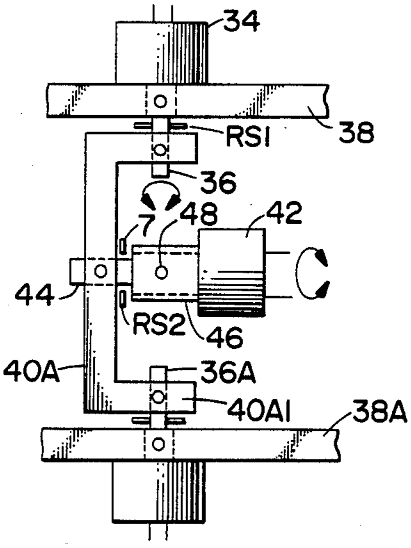
FIG. 6 illustrates an alternative embodiment of the invention relative to FIG. 3A.

In operation, assume that the joystick (control stick) 48 is in the perpendicular, center position, and, an error voltage lying in a range between ±300 mV and ±12 volts is applied to the non-inverting terminal of amplifiers 58 and 58′. $R_1$ and $R_2$ may be chosen to be 40K and 1K, respectively. For example, an error voltage approximately equal to ±300 mV may appear at the non-inverting input terminal of amplifiers 58 and 58′. As a result, the error voltage will appear at the inverting input terminal of amplifiers 58 and 58′ because of attenuation by the resistive divider network $R_1$–$R_2$ (or $R_1'$–$R_2'$). The voltage gain of the amplifiers 58 and 58′ is 1.025 or essentially equal to unity. By adjusting potentiometers 62 and 62′, the output voltage appearing at the output terminal of amplifiers 58 and 58′ may be adjusted to be approximately equal to zero. Referring to FIG. 6, a further refinement to the embodiment of invention shown in FIG. 3A is illustrated. In FIG. 6, the L-shaped arm 40 shown in FIG. 3A has been extended to include an additional L-shaped arm 40A. The short leg portion 40A1 of the additional L-shaped arm 40A is pivotally secured to an additional frame 38A via an additional shaft 36A. This construction of the joystick apparatus shown in FIG. 6 provides said apparatus with a greater rigidity and reliability when the joystick 48 of said apparatus is rotated in the horizontal (X) direction.

As is understood from the foregoing description, the joystick apparatus according to the present invention features a very simple mechanical construction. This is mainly due to the fact that the shafts 36 and 44 of the first and second potentiometers 34 and 42 function as the bearings of the joystick apparatus. This use of the shafts as bearings reduces the mechanical tolerance of the joystick apparatus. Furthermore, the conventional complicated mechanical mechanism associated with the joystick apparatus of the prior art has been replaced by a simple electrical circuit. This permits the use of a low cost, simple, joystick apparatus, the joystick apparatus of the present invention.

The invention being thus described, it will be obvious that the same may be varied in many ways. Such variations are not to be regarded as a departure from the spririt and scope of the invention and all such modifications as would be obvious to one skilled in the art are intended to be included within the scope of the following claims.

I claim:

1. A joystick apparatus comprising:

first means including a rotatable shaft disposed therethrough for developing an electrical signal in accordance with the degree of rotation of said shaft, said first means being rigidly mounted on a frame;

second means including a rotatable shaft disposed therethrough for developing an electrical signal in accordance with the degree of rotation of said shaft, said second means having a base extending from and rigidly affixed thereto;

means for connecting said shaft of said first means to said shaft of said second means; and means connected to said base for rotating said second means about said shaft thereof and for rotating said shaft of said first means within said first means via said connecting means.

2. The joystick apparatus of claim 1 further comprising means for zeroing said electrical signals when said rotating means is in a center position.

3. The joystick apparatus of claim 2 further comprising spring means mounted to said shafts of said first means and said second means for returning said rotating means to said center position when said rotating means is released.

4. A joystick apparatus as recited in claim 3 wherein said connecting means comprises a L-shaped bracket having a short leg and an orthogonal long leg, said short leg being connected to said shaft of said first and second means and said long shaft being connected to said shaft of said first and second means.

5. The joystick apparatus of claim 3 wherein said connecting means comprises a U-shaped bracket having two short legs and an integrally connecting bar, one of said two short legs being connected to said shaft of said first means and the other of said short legs being connected to a rotatable shaft of a third means which is opposite to and operates in parallel with said first means, and said shaft of said one of said second means being connected to the center of said integrally connecting bar.

* * * * *